United States Patent Office 3,506,802
Patented Apr. 14, 1970

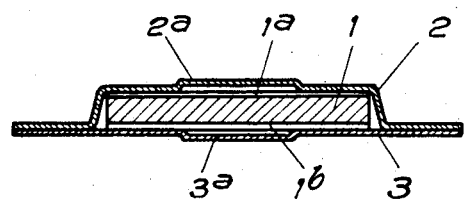
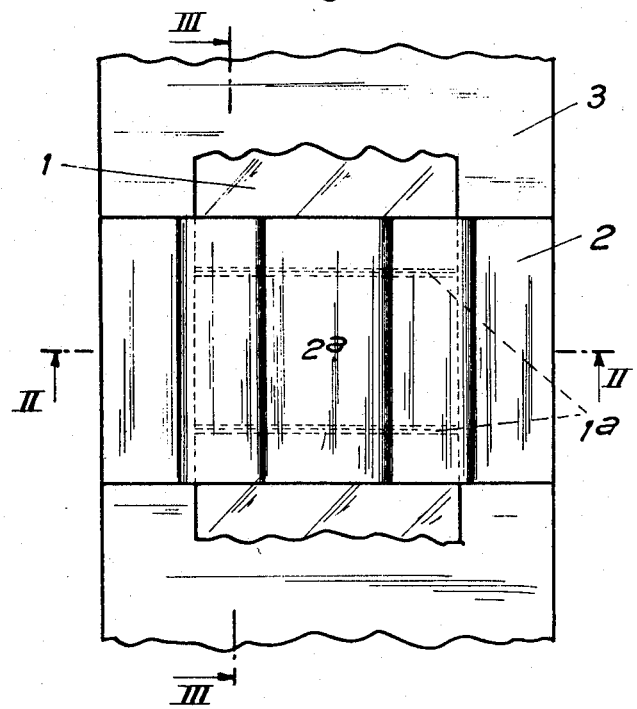
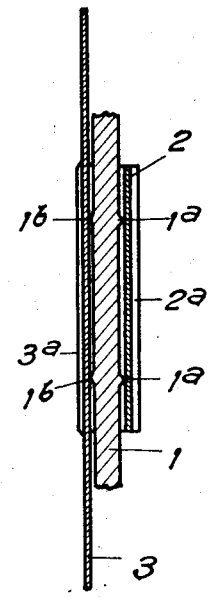

3,506,802
RESISTANCE WELDING
Edmond Henry-Biabaud, Paris, France, assignor to Societe Anonyme Automobiles Citroen, Paris, France
Filed May 23, 1966, Ser. No. 551,966
Claims priority, application France, May 21, 1965, 3,211
Int. Cl. B23k 9/28, 11/10
U.S. Cl. 219—93
3 Claims

ABSTRACT OF THE DISCLOSURE

A method of welding two metal plates of different thicknesses comprises providing the thicker plate with at least one integral continuous rectilinear rib along a surface thereof which is to face the thinner plate, placing the rib in contact with the thinner plate and resistance welding the plates together along said rib.

This invention relates to a resistance welding method and to assemblies produced by the method.

The electrical resistance welding of sheet metal members of widely different thicknesses necessitates certain precautions and a special adaptation of the material to be welded.

It has already been proposed to effect welds in which the member of larger bulk is provided with points in relief which localize the flow of current and, as a result, limit the heating zone of the metal.

According to the present invention there is provided in a method for welding together two metal members of different bulk, the steps of providing the member of larger bulk with at least one rib on a surface thereof which is to face the other member, placing the said rib in contact with the other member, and passing an electric current through said members thereby welding them together.

Further according to the present invention there is provided an assembly of two resistance welded parts of different thickness, the thicker said member having at least one rib by which it is welded to the thinner said member.

The present invention is applicable, in particular, to a construction involving the insertion, in a welded assembly, of sheet metal members of such a thickness that they can serve as reinforcements, or as supports or securing members for attached parts.

Owing to the disposition referred to above, the welding can be effected with conventional means and is effected along the whole of the lines in relief or possibly along portions only of these lines.

The lines in relief may be formed by any means, for example by the technique known as "projection" but the thick member may likewise be stamped out to give a profile including such lines. The welding is thus extremely simple to effect and is effected along such points as those which must necessarily be obtained by projection, the latter being a supplementary operation.

The relief lines may have any desired form, for example rectilinear.

In order that only part of the relief lines should come into contact with the thinner member, the latter has preferably, recesses arranged crosswise to the relief lines.

The thicker member and/or the thin member may be constituted by sheet metal parts of non-plane surface, for example embossed or pebbled.

The assembly may be reinforced by an opposing plate welded in a similar manner, in which case the thicker member comprises relief lines on two of its opposed faces.

There is described hereafter, by way of non-limiting example, one embodiment of an assembly in accordance with the invention with reference to the accompanying drawings in which:

FIGURE 1 is a plan view of an assembly in accordance with the invention;

FIGURE 2 is a section along the line II—II of FIG. 1; and

FIGURE 3 is a section on the line III—III of FIG. 1.

In the drawing, a thick member 1 is welded between two thin plates or other members 2 and 3. The member 1 comprises on its faces directed towards the plates 2 and 3 lines or ribs in relief 1a and 1b which, as shown, are rectilinear. The plate 2 comprises a projection or embossed part 2a which lies at right angles to the lines 1a. The plate 3 comprises a projection or embossed part 3a which lies at right angles to the lines 1b. The plates 2 and 3 are thus in contact with the thick member 1 only through the intermediary of parts of the line 1a and 1b, respectively. By means of this arrangement welding can be effected with appropriately dimensioned electrodes on a conventional welding machine.

It will be clear that the invention could not be considered to be limited to the embodiment described and shown but covers, on the contrary, all modifications thereof.

What I claim is:

1. A method of welding two metal plates of different thicknesses which comprises providing the thicker plate with at least one integral continuous rectilinear rib along an entire surface thereof which is to face the thinner plate, providing the thinner plate with a raised channel portion, placing said rib in contact with that thinner plate, whereby said raised channel portion is arranged to run substantially at right angles and to bridge said rib of said thicker plate, and resistance welding said plates together along said rib whereby the plates are welded together only along the non-bridged portion of said rib.

2. The method of claim 1, which further comprises sandwiching the thicker plate between two said thinner plates arranged in overlapping relation to said thicker plate, forming at least one said thinner plate about said thicker member to bring said thinner plates into contact with each other in the overlapping portions thereof, providing said thicker plate with more than one said ribs in parallel along both surfaces facing said thinner plates and providing both thinner plates with raised channel portions at right angles to and bridging said ribs on each side of said thicker plate.

3. A resistance welded assembly which comprises a relatively thick metal plate, welded along integral, continuous rectilinear ribs on both top and bottom surfaces to relatively thin metal sandwiching plates overlapping said thick plate and welded together along the overlapping portions thereof, said thin plates having raised channel portions substantially at right angles to and bridging said ribs whereby the latter are welded to said thin plates only along the non-bridged portions of said ribs.

References Cited

UNITED STATES PATENTS

| 928,701 | 7/1909 | Rietzel | 219—93 |
| 1,020,056 | 3/1912 | Rietzel | 219—93 |
| 2,179,398 | 11/1939 | Briggs | 219—93 |
| 2,257,451 | 9/1941 | Barnes | 219—93 |
| 2,277,871 | 3/1942 | Mitchell et al. | 219—93 |
| 1,132,094 | 3/1915 | Hosford | 219—93 X |
| 2,430,977 | 11/1947 | Eggleston | 219—93 X |

JOSEPH V. TRUHE, Primary Examiner